US010956115B2

(12) United States Patent
Bastide et al.

(10) Patent No.: US 10,956,115 B2
(45) Date of Patent: Mar. 23, 2021

(54) INTELLIGENT EXERCISE MUSIC SYNCHRONIZATION

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 16/109,652

(22) Filed: Aug. 22, 2018

(65) Prior Publication Data

US 2020/0065056 A1 Feb. 27, 2020

(51) Int. Cl.
*G06F 3/16* (2006.01)
*G10L 21/043* (2013.01)
*G10L 15/08* (2006.01)
*G06F 3/01* (2006.01)
*G06K 9/00* (2006.01)
*G06N 20/00* (2019.01)

(52) U.S. Cl.
CPC .............. *G06F 3/165* (2013.01); *G06F 3/017* (2013.01); *G06F 3/167* (2013.01); *G06K 9/00302* (2013.01); *G10L 15/08* (2013.01); *G10L 21/043* (2013.01); *G06N 20/00* (2019.01); *G10H 2210/076* (2013.01); *G10L 2015/088* (2013.01)

(58) Field of Classification Search
CPC ............... G10L 2015/088; G10L 15/22; G10L 2015/223; G10L 2015/226; G10L 2015/227; G10L 15/265; G10L 21/043; G06F 3/665; G06F 3/617; G10H 2210/076; A63B 24/0087; A63B 24/0093
USPC .................................................. 704/270, 274
See application file for complete search history.

(56) References Cited

U.S. PATENT DOCUMENTS 6,672,991 B2 1/2004 O'Malley
6,716,139 B1 * 4/2004 Hosseinzadeh-Dolkhani ..............
A63B 24/00
482/1

(Continued)

OTHER PUBLICATIONS

Ståhl, Olov, et al. "A mobile health and fitness companion demonstrator." Proceedings of the Demonstrations Session at EACL 2009. Apr. 2009, pp. 65-68. (Year: 2009).*

(Continued)

*Primary Examiner* — Samuel G Neway
(74) *Attorney, Agent, or Firm* — Robert C. Bunker (57) ABSTRACT

A method, computer system, and a computer program product for intelligently synchronizing exercise music for an instructor based group workout is provided. The present invention may include identifying at least one goal workout. The present invention may then include receiving a plurality of verbal cues associated with an instructor and a plurality of nonverbal cues associated with the instructor. The present invention may also include analyzing the received plurality of verbal cues and the received plurality of nonverbal cues. The present invention may further include generating the exercise music based on the analyzed plurality of verbal cues and analyzed plurality of nonverbal cues.

15 Claims, 5 Drawing Sheets

(56) References Cited

U.S. PATENT DOCUMENTS

| | | | |
|---|---|---|---|
| 7,683,252 B2 | 3/2010 | Oliver et al. | |
| 8,568,277 B2 | 10/2013 | Johnson | |
| 9,880,805 B1* | 1/2018 | Guralnick | G06F 3/165 |
| 2009/0158920 A1* | 6/2009 | Itami | A63B 24/0062 |
| | | | 84/645 |
| 2010/0273610 A1* | 10/2010 | Johnson | H04M 1/72527 |
| | | | 482/9 |
| 2011/0053131 A1* | 3/2011 | Regnier | G10H 1/0016 |
| | | | 434/250 |
| 2011/0072955 A1* | 3/2011 | Turner | G10H 1/40 |
| | | | 84/612 |
| 2012/0239763 A1* | 9/2012 | Musil | G06Q 50/01 |
| | | | 709/206 |
| 2013/0137073 A1* | 5/2013 | Nacey | A63B 24/0075 |
| | | | 434/247 |
| 2013/0137552 A1 | 5/2013 | Kemp et al. | |
| 2014/0141396 A1* | 5/2014 | Spratt | G10H 1/40 |
| | | | 434/247 |
| 2015/0038806 A1* | 2/2015 | Kaleal, III | A61B 5/0205 |
| | | | 600/301 |
| 2015/0081066 A1* | 3/2015 | Yeh | G06F 16/60 |
| | | | 700/94 |
| 2015/0287291 A1* | 10/2015 | Regnier | G10H 1/0016 |
| | | | 455/502 |
| 2016/0086500 A1* | 3/2016 | Kaleal, III | G06T 19/00 |
| | | | 434/257 |
| 2017/0351417 A1* | 12/2017 | Manico | G06F 16/50 |
| 2018/0005615 A1 | 1/2018 | MacPherson | |
| 2018/0032611 A1* | 2/2018 | Cameron | G06K 9/723 |
| 2018/0126248 A1* | 5/2018 | Dion | A63B 71/0622 |
| 2019/0073693 A1* | 3/2019 | Moukaddem | G06F 40/131 |
| 2019/0118067 A1* | 4/2019 | Tana | A63B 24/0075 |
| 2019/0142350 A1* | 5/2019 | Bastide | A61B 5/486 |
| | | | 600/300 |
| 2019/0336827 A1* | 11/2019 | Intonato | A63B 22/025 |
| 2020/0065056 A1* | 2/2020 | Bastide | G06F 3/0346 |

OTHER PUBLICATIONS

Sukel, K., et al. "Towards and interactive computer-based dance tutor." Concept Paper, Georgia Institute of Technology, Atlanta, 1998, pp. 1-5. (Year: 1998).*

Mell et al., "The NIST Definition of Cloud Computing," National Institute of Standards and Technology, Sep. 2011, p. 1-3, Special Publication 800-145.

Rosenzweig, "How Music Can Enhance Your Workout," Active. com Fitness Articles, p. 1-7, https://www.active.com/fitness/articles/how-music-can-enhance-your-workout, Accessed on Aug. 15, 2018.

* cited by examiner

INTELLIGENT EXERCISE MUSIC SYNCHRONIZATION

BACKGROUND

The present invention relates generally to the field of computing, and more particularly to data processing.

Becoming and remaining motivated to exercise on a regular basis is challenging for most people. As such, some people choose to go to the gym and work out in a group. An integral aspect of a workout is the background music utilized by the instructors to encourage participants to workout. However, a workout group may become overcrowded thereby creating a difficult environment for a participant to keep up with the workout and for the instructor to follow the music sequence in the group due to the varied experience level of the participants.

SUMMARY

Embodiments of the present invention disclose a method, computer system, and a computer program product for intelligently synchronizing exercise music for an instructor based group workout. The present invention may include identifying at least one goal workout. The present invention may then include receiving a plurality of verbal cues associated with an instructor and a plurality of nonverbal cues associated with the instructor. The present invention may also include analyzing the received plurality of verbal cues and the received plurality of nonverbal cues. The present invention may further include generating the exercise music based on the analyzed plurality of verbal cues and analyzed plurality of nonverbal cues.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for intelligently synchronizing exercise music for an instructor based group workout. As such, the present embodiment has the capacity to improve the technical field of data processing by utilizing verbal and nonverbal cues associated with an instructor to adjust the exercise music associated with the workout. More specifically, the exercise music synchronization program may identify the goal workout, and then, utilize an audio capturing device (e.g., microphone, speaker, audio recorder), to extract keywords from the comments of the instructor. The exercise music synchronization program may then analyze the instructor's nonverbal cues (e.g., body language and facial expression) to determine the expected workout intensity. The exercise music synchronization program may then adjust the workout tempo and workout music (i.e., exercise music) volume.

As previously described, becoming and remaining motivated to exercise on a regular basis is challenging for most people. As such, some people choose to go to the gym and work out in a group. An integral aspect of a workout is the background music utilized by the instructors to encourage participants to workout. However, a workout group may become overcrowded thereby creating a difficult environment for a participant to keep up with the workout and for the instructor to follow the music sequence in the group due to the varied experience level of the participants.

Even though there may be exercise music running in the background designed to encourage people to work out, not all the instructors are able to synchronize their voice commands with the music due to different reasons. Therefore, it may be advantageous to, among other things, synchronize the verbal cues (e.g., voice commands or commands) associated with the instructor and nonverbal cues associated with the instructor to increase the workout motivation of the user (i.e., participant) in a seamless and very fun manner, and improve the synchronicity between the nonverbal and verbal cues (i.e., nonverbal and verbal communication) of the instructor and the exercise music.

The present embodiment may include synchronizing, in real time, the workout music (i.e., exercise music) based on the nonverbal cues (e.g., body language (i.e., body language cues) and facial expressions) associated with the instructor and verbal cues (e.g., voice commands) associated with the instructor.

According to at least one embodiment, the exercise music synchronization program may intelligently synchronize the exercise music (i.e., workout music) and the commands of the instructor for the most effective outcome for the participants (i.e., users). The exercise music synchronization program may include selecting a goal or category for the workout and monitoring the microphone of the instructor leading the workout. The exercise music synchronization program may then adjust, based on the goal of the workout and the tone associated with the instructor, the supporting audio for the workout to synergize the workout (e.g., adjusting the tempo upward or downward, and intensifying the heartrates of the users). As such, the exercise music synchronization program may seamlessly increase the workout motivation of the user in a fun manner, and improve the synchronicity between the commands and the exercise music.

According to at least one embodiment, the exercise music synchronization program may be integrated with camera and speech recognition sensors. The exercise music synchronization program may then collect and analyze the speech text (i.e., verbal cues) associated with the instructor and the facial expressions (i.e., nonverbal cues) associated with the instructor.

The present embodiment may include an adjustment of the exercise music based on a theme utilized by a fitness facility (e.g., gymnasium, group workout facility) on a particular day. For example, on a strength day, the weight room group is exercising using weights, low repetitions, and the treadmill group is exercising with high inclines and low speed. As such, the exercise music may include a slower tempo and heavier bass with simple time (e.g., the beat of a piece of music that may be broken down into two-part rhythms thereby creating a simple time signature which may be easier to count and may sound more natural to a listener). However, on an endurance day, the weight room is exercising using higher repetitions and the treadmill group is exercising using low inclines and high speed for distance. Therefore, the exercise music may include an upward tempo and faster beat.

According to at least one embodiment, the exercise music synchronization program may take into consideration the music theme and predetermine the flow of the workout with regards to the exercise music, absent any verbal or nonverbal cues associated with the instructor.

According to at least one embodiment, the exercise music synchronization program may prepopulate some known keywords that the instructors usually uses in a workout for a particular targeted group workout. For example, some of the sample keywords may include "Base", "Push" and "All out." Therefore, the exercise music synchronization program may increase the tempo and the music volume (i.e., music dynamics) when the instructor's commands include these sample keywords.

According to at least one embodiment, the exercise music synchronization program may continuously monitor the nonverbal cues associated with the instructor (e.g., body language, hand gestures and facial expressions). The exercise music synchronization program may associate the commands of the instructor with the nonverbal cues of the instructor. The exercise music synchronization program may then generate a personalized data model for each instructor, which may be stored in a database for future purposes. For example, when the instructor is running and rowing at a base pace level, the exercise music is a normal sound level with a regular intensive effect. If the instructor changes to a "Push Yourself" type of pace level, then the exercise music becomes faster than the normal pace with a relatively higher intensive effect. If the instructor, once again, changes to a 30-second interval "all out" type of pace level, then the exercise music may be faster than the normal pace with a very high intensive effect.

The present embodiment may include an increased alertness of the participant (i.e., user) based on the exercise music that is playing while the participant works out. For example, instead of listening to the phrase "Base" and waiting for the specific call to base with their catch phrase, or similar example, the instructor states "Ok, take it down to base everyone" or "Ok, just 30 more seconds and we can take it down to base everyone," and the participant may follow the pattern of the exercise music to change the workout pace (i.e., exercise pace) accordingly.

According to at least one embodiment, the exercise music synchronization program may be designed for a user to participate in a fitness class remotely, even though the instructor is conducting a group workout.

The present embodiment may include intelligently synchronizing exercise music and the verbal and nonverbal cues of the instructor for an effective outcome for the participants (i.e., remote and in person) of the fitness class. The exercise music synchronization program may be integrated into a previously existing software application for playing music. According to at least one other embodiment, the exercise music synchronization program may also be a separate program, not integrated into another software program, for playing music.

Figure 1:
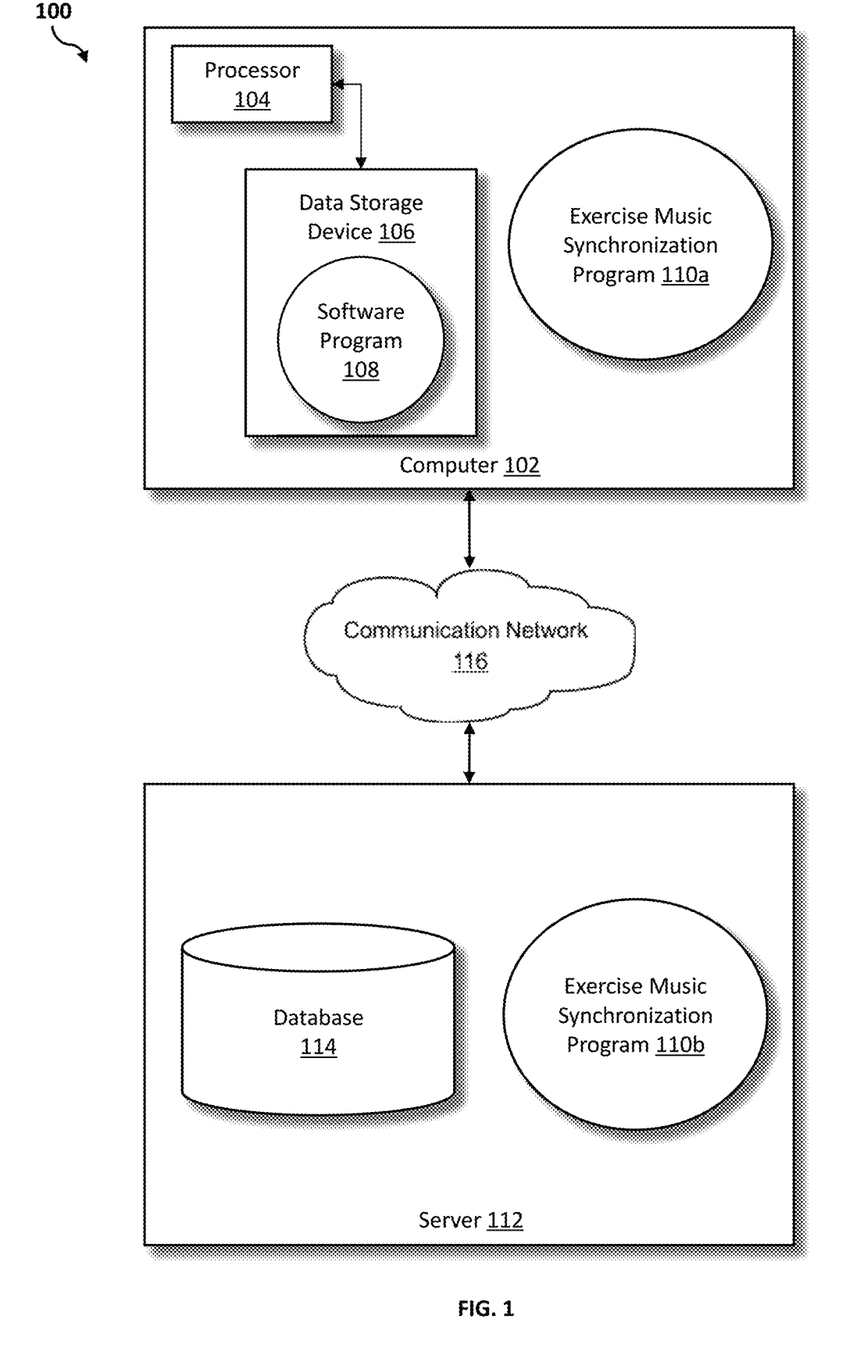
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an exercise music synchronization program 110a. The networked computer environment 100 may also include a server 112 that is enabled to run an exercise music synchronization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the exercise music synchronization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the exercise music synchronization program 110a, 110b (respectively) to intelligently synchronize exercise music for an instructor based group workout. The exercise music synchronization method is explained in more detail below with respect to FIG. 2.

Figure 2:
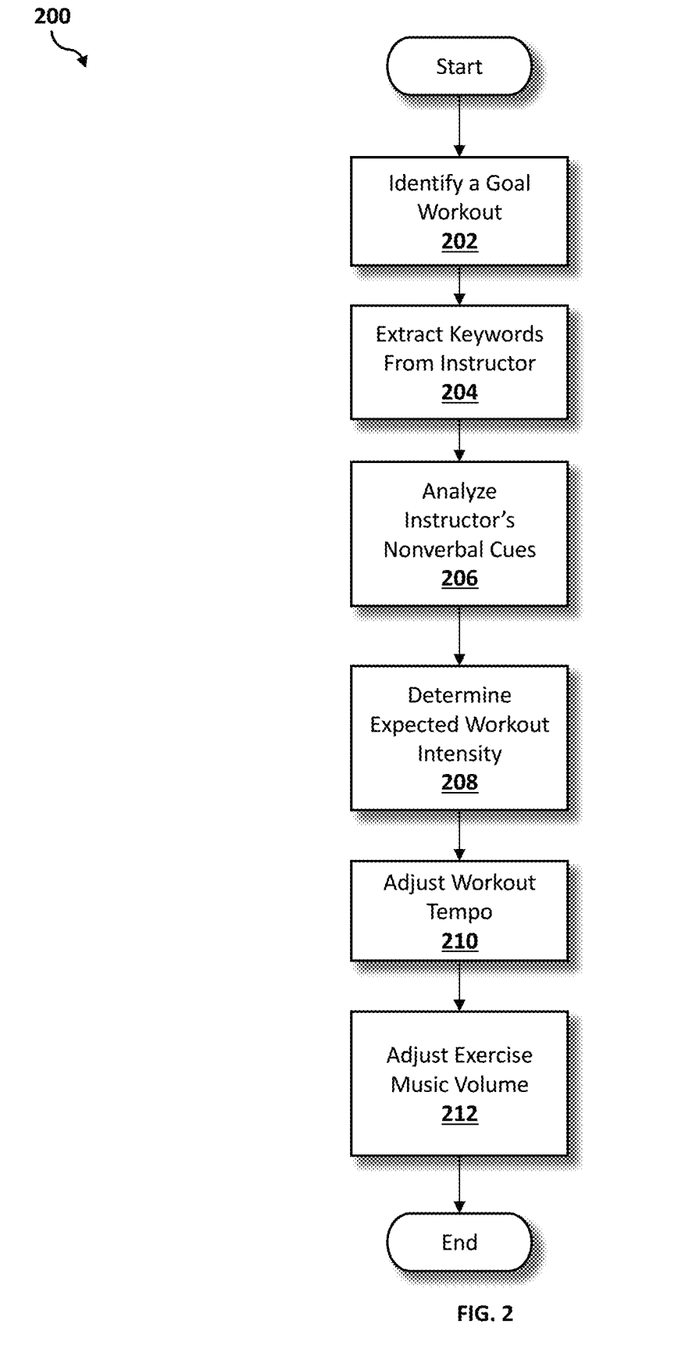
FIG. 2 is an operational flowchart illustrating a process for intelligently synchronizing exercise music for an instructor based group workout according to at least one embodiment.

Referring now to FIG. 2, an operational flowchart illustrating the exemplary intelligent exercise music synchronization process 200 used by the exercise music synchronization program 110a and 110b according to at least one embodiment is depicted.

At 202, a goal workout is identified. Using a software program 108 on the user device (e.g., user's computer 102), the exercise music synchronization program 110a, 110b may receive at least one goal workout (i.e., a fitness class that includes a specific type of workout (e.g., 60 minutes of strength training, 45 minutes of cardiovascular workout, 30 minutes of endurance) as determined by an instructor) selected by a user, from the server 112 or a cloud storage service via communications network 116. The user may select the goal workout from a website or application program interface (API) associated with a particular fitness facility. The exercise music synchronization program 110a, 110b may then receive the selected goal workout via communications network 116. The exercise music synchronization program 110a, 110b may then identify the selected goal workout with the specific user.

In at least one embodiment, the exercise music synchronization program 110a, 110b may prompt the user (e.g., via a dialog box) to select the goal workout. The user may, for example, select the "Select Goal Workout Without User Profile" button located at the bottom of the display monitor. The user may then utilize a graphical user interface (GUI) to log into a website or API associated with the fitness facility that the user has an active membership. The user may, for example, interact with a GUI associated with the selected fitness facility to select a goal workout (i.e., class). After the user selects the goal workout, the selected goal workout may be received by the exercise music synchronization program 110a, 110b via communications network 116.

In at least one embodiment, the user may select a goal workout occurring in the future (e.g., approximately 24-72 hours before the start of the goal workout) based on the individual policies and rules associated with attending, scheduling and cancelling goal workouts for individual memberships and individual fitness facilities. Once the goal workout is scheduled, the exercise music synchronization program 110a, 110b may identify that goal workout with the user device. A prompt (e.g., via a dialog box) may appear on the user device for any changes associated with the selected goal workout, or to remind the user, via the user device, that the goal workout will start a particular time.

In at least one embodiment, the user may determine when the user will receive notifications or reminders associated with an upcoming goal workout. The exercise music synchronization program 110a, 110b may utilize a computer display monitor existing on the user device. A screen may appear in which, for example, a "Settings" button is located on the bottom right side. Once the user clicks on the "Settings" button, the user may be prompted (e.g., via dialog box) to indicate the setting that the user intends to change. In the list of settings, there may be a "Notifications/Reminders" button. If the user clicks the "Notifications/Reminders" button, then the dialog box may expand the list of possible actions associated with the generated notifications or reminders to the user (e.g., time-period for notifications/reminders, user device(s) to provide notifications/reminders, deactivate notifications/reminders, displayed timer to countdown the start or duration of the goal workout) that may be implemented by the user. The user may select the preferred action. If the user clicks on the "Time for Notifications/Reminders" button, then the dialog box may expand with a list of possible times for notifications/reminders ranging from 1 hour to 1 week. The user may select the preferred time for notifications/reminders. The dialog box may expand and prompt the user to confirm the preferred time for notification/reminders by clicking the "Yes" or "No" buttons under a statement restating the preferred time for notifications/reminders. Once the user clicks "Yes," the dialog box may disappear. If, however, the user selects the "No" button, then the dialog box may remain for the user to clarify the preferred time for notifications/reminders.

For example, User Z utilizes a television located in User Z's living room to log onto an API associated with Gym Z select a workout goal. User Z, a return member with an active membership at Gym Z, notices that there is a kickboxing class with 30 minutes of endurance starting in 45 minutes. As such, User Z clicks on the goal workout, kickboxing class with 30 minutes of endurance training, on the API thereby identifying the kickboxing class with 30 minutes of endurance training as the goal workout. Since the identified goal workout starts in 45 minutes, User Z previously set a reminder for any upcoming goal workout in which a timer is displayed on the television (or any user device associated with User Z) to countdown the time before the upcoming goal workout starts, and when there is only five minutes remaining before the start of the goal workout, a bleeping sound is emitted every 60 seconds until User Z starts the goal workout.

In another embodiment, the exercise music synchronization program 110a, 110b may identify the goal workout based on a user profile. The user may, for example, select the "Select Goal Workout with User Profile" button located at the bottom of the display monitor. The exercise music synchronization program 110a, 110b may then prompt the user (e.g., via dialog box) to provide the username associated with the user. The dialog box, for example, may include a comment "Username" with a blank comment box to the right. Once the user enters the username associated with the user, the user may select the "Submit" button located below. If the user, for example, is a return user, the exercise music synchronization program 110a, 110b may upload the user profile associated with the user. The user profile may include a list of fitness facilities that the user has an active membership, a list of previously participated classes, user feedback for the previously participated classes and any previously selected goal workouts. In addition, the user profile may include personal characteristics associated with the user (e.g., weight, height, gender, daily activity level at home, profession, daily activity level at work) and fitness goals (e.g., how much weight does the user intend to lose, what is the time-period of weight loss, does the user have a personal trainer, does the user have any upcoming milestones or events that are influencing the user's fitness goal). For example, the user enters the username "SUMMERGOALS2019" and clicks the "Submit" button.

If, however, the user is first-time user, then, according to at least one implementation, the user, for example, may click the "First-Time User" button located to the left of the "Submit" button in the dialog box. The user may then be prompted (e.g., via dialog box) to create a user profile with a list of fitness facility memberships and fitness goals associated with the user. Once the user finished setting up the user profile, then the user may click the "Finish" button located on the bottom of the dialog box. The created user profile may then be stored on a database 114 associated with the exercise music synchronization program 110a, 110b.

Each time that the user logs into the exercise music synchronization program 110a, 110b with the username associated with the user, the generated information (e.g., the participated goal workout, any user feedback for the participated class and any selected goal workout) may be saved on the database 114 of the exercise music synchronization program 110a, 110b. Additionally, the user profile may be created, modified or updated by the user or service providers (i.e., a third party company or individual that the user has given consent to access the user profile for a specific or general purpose).

In another embodiment, the user may select the goal workout, and the exercise music synchronization program 110a, 110b may generate a recommended list of goal workouts. The user may then select from the recommended list of goal workouts, and then the user may be directed to the website or API associated with the fitness facility that is hosting that selected goal workout. If the user is a member of that fitness facility, then the user may be prompted to enter the user's information to start or register for that goal workout. If, however, the user is not a member of that fitness facility, then the user may be, depending on the individual fitness facility, offered a free trial membership for that fitness facility, offered the goal workout at a discounted or regular price, or prohibited from registering for that goal workout.

Next at 204, keywords are extracted from an instructor. Utilizing a speech capturing device (e.g., microphone, audio recorder) (i.e., biometric sensors associated with at least one speech recognition device, or speech recognition sensors), the exercise music synchronization program 110a, 110b may receive voice commands (i.e., speech text, commands) from an instructor during the goal workout via communications network 116. The exercise music synchronization program 110a, 110b may then utilize a text extracting engine to analyze the received voice commands associated with the instructor to extract the keywords (e.g., "Base," "Pull out," "Speed up," "Cooling down," "All out") in the speech associated with the instructor. The exercise music synchronization program 110a, 110b may recognize the extracted keywords from the instructor as words associated with a particular action for the user, or for a particular action for the exercise music synchronization program 110a, 110b (e.g., particular type of exercise music).

In at least one embodiment, the exercise music synchronization program 110a, 110b may include a predefined list of the keywords associated with the instructor that correspond with a particular action for the user, or for a particular action for the exercise music synchronization program 110a, 110b. The list of keywords may be manually modified or changed by the instructor or an administrator.

In at least one embodiment, the instructor may modify or change the predefined list of keywords associated with the instructor that correspond with a particular action for the user. The exercise music synchronization program 110a, 110b may utilize a computer display monitor existing on the user device. A screen may appear in which, for example, a "Settings" button is located on the bottom right side. Once the instructor clicks on the "Settings" button, the instructor may be prompted (e.g., via dialog box) to indicate the setting that the instructor intends to change. In the list of settings, there may be a "Keywords" button. If the instructor clicks the "Keywords" button, then the dialog box may expand the list of predefined keywords already included in the exercise music synchronization program 110a, 110b. At the bottom of the expanded list of predefined keywords, there may be a blank text box for the instructor to include at least one new keyword and a corresponding comment box for the corresponding action associated with the new keyword(s) (i.e., corresponding action for the user (e.g., increase incline of bicycle, peddle faster, slow down), or corresponding action for the exercise music synchronization program 110a, 110b (e.g., upward tempo, change music, increase volume)). Once the instructor enters at least one new keyword and the corresponding action, then the instructor may click the "Submit" button located under the text and comment boxes at the bottom of the dialog box. Then another dialog box may appear and prompt the instructor to confirm the new keyword(s) and the corresponding action by clicking the "Yes" or "No" buttons under a statement restating the new keyword(s) and the corresponding action. Once the instructor clicks "Yes," the dialog box may disappear. If, however, the instructor selects the "No" button, then the dialog box may remain for the instructor to clarify the new keyword(s) and corresponding action.

Continuing the previous example, during the kickboxing class, the instructor located at Gym Z encourages the participants, including User Z, by stating "Go All Out". The microphone headset affixed to the instructor is connected to the exercise music synchronization program 110a, 110b, which has previously correlated the words "Go All Out" to the instructor commanding the participants to increase speed or perform the particular task faster.

Then, at 206, the nonverbal cues associated with the instructor are analyzed. Utilizing at least one camera, at least one form of audio recording or speech recognition device, at least one form of wearable device (e.g., augmented reality (AR) glasses, AR gloves, wearable health or fitness device) and at least one form of other biometric device, via at least one biometric sensor, to run a software program 108 to monitor and collect the nonverbal cues (e.g., facial expressions, instructor tone (i.e., tone cues), heartbeat monitor, hand gestures, body language (i.e., body language cues), pace of breathing, behavioral pattern recognition) associated with the instructor. The exercise music synchronization program 110a, 110b may then utilize a software program 108 to analyze the monitored and collected nonverbal cues associated with the instructor.

Additionally, the biometric devices utilized to monitor and collect nonverbal cues associated with the instructor may be located on the instructor, in (or in close proximity to) the fitness room that the instructor is conducting the goal workout. At least one of the following forms of nonverbal cues (i.e., nonverbal communication) associated with the instructor may be monitored and collected: body language cues (e.g., the body's unconscious cues or actions); hand gestures (e.g., movement of the hands that convey meaning); tone cues (e.g., the vocal sound associated with the pitch, quality and strength of the voice commands associated with the instructor); or facial expressions (e.g., motions or positions of the muscles beneath the skin of the face that convey meaning).

Continuing the previous example, while the instructor yelled the words, "Go All Out," the instructor's heartrate and pace of breathing has accelerated as monitored by the fitness watch on the instructor's wrist, the instructor's tone is loud and direct as monitored by the audio recording device located in the fitness room of Gym Z, the instructor's facial expression is serious as monitored by the facial recognition sensors located on the AR glasses that the instructor is wearing, and the instructor's hand gestures are indicating an acceleration in motion as monitored by the body language/motion detection sensors associated with the instructor's fitness watch. In addition, the instructor's serious facial expression and hand gestures are monitored by the multiple cameras associated with the exercise music synchronization program 110a, 110b and located in the fitness room at Gym Z that confirm the analyzed facial expression and hand gestures of the instructor.

Then, at 208, the expected workout intensity is determined. Based on the analyzed nonverbal cues associated with the instructor and the extracted keywords from the instructor (i.e., biometric data associated with the nonverbal cues and voice commands collected from the biometric sensors), the exercise music synchronization program 110a, 110b may determine the expected workout intensity for the user. The expected workout intensity (i.e., the amount of energy expended when exercising (e.g., low, moderate and high/vigorous workout intensity levels)) associated with the exercise music may be utilized for the exercise music synchronization program 110a, 110b to select a particular type of exercise music. As such, based on the data generated from the analyzed nonverbal cues associated with the instructor and the extracted keywords from the instructor, the list of corresponding exercise music may be reduced to include only the exercise music that may correspond with the determined workout intensity. For example, if the exercise music synchronization program 110a, 110b determines that the keyword "Push" is associated with a high workout intensity, then when the instructor commands "Push" and the body language of the instructor (i.e., the instructor starts to pedal faster) supports the proposition that the instructor intends to increase the speed of the workout, the exercise music synchronization program 110a, 110b may select and play exercise music corresponding with a high intensity workout.

In the present embodiment, the exercise music synchronization program 110a, 110b may select exercise music including expected workout intensity and workout tempo from a third-party digital music service, locally stored music on the user device (e.g., user computer 102), server 112 or a cloud storage service, or any other forms of music storage and retrieval software program or service. Utilizing a software program 108, the selected exercise music may be uploaded to the exercise music synchronization program 110a, 110b via communications network 116. With each determination (e.g., expected workout intensity or workout tempo), the list of corresponding exercise music may be reduced by the exercise music synchronization program 110a, 110b until the appropriate corresponding exercise music may be selected by the exercise music synchronization program 110a, 110b.

Continuing the previous example, while the exercise music synchronization program 110a, 110b is collecting, monitoring and analyzing the facial expressions, heartrate, breathing pace, tone and hand gestures of the instructor, and extracting the keyword "Go All Out", the exercise music synchronization program 110a, 110b instructor is playing an electronic dance music song with a slow beat from a locally stored music playlist on the instructor's mobile phone. The exercise music synchronization program 110a, 110b determines that the expected workout intensity has changed from a moderate level to a high intensity level, and the analyzed nonverbal and verbal cues indicate that the exercise music should change to synchronize with the verbal and nonverbal cues of the instructor. As such, the exercise music synchronization program 110a, 110b searches the instructor's locally stored music playlist for a song with a high workout intensity to correspond with the instructor's cues. The exercise music synchronization program 110a, 110b determines that there are 108 songs that correspond with the high intensity level.

Then, at 210, the workout tempo is adjusted. Based on the analyzed nonverbal cues associated with the instructor and the extracted keywords from the instructor, the exercise music synchronization program 110a, 110b may adjust the workout tempo (e.g., upward, downward tempo) for the user. The workout tempo (i.e., the speed at which a passage of music is played) associated with the exercise music may be utilized for the exercise music synchronization program 110a, 110b to select a particular type of exercise music. As such, based on the data generated from the analyzed nonverbal cues associated with the instructor and the extracted keywords from the instructor, the list of corresponding exercise music may be reduced to include only the exercise music that may correspond with the adjusted workout tempo.

Continuing the previous example, the exercise music synchronization program 110a, 110b determines that the workout tempo should be adjusted to correspond with high workout intensity level. As such, the exercise music synchronization program 110a, 110b searches for songs with an upward workout tempo, and therefore determines that 24 of the 108 songs with a high intensity level have an upward tempo compared to the previously playing exercise music. The exercise music synchronization program 110a, 110b then selects a song from the 24 songs with the corresponding high intensity level and upward tempo.

In another embodiment, the exercise music synchronization program 110a, 110b may utilize machine learning to select songs specifically related to the instructor. Based on previously used songs by the instructor, or user or instructor feedback, the exercise music synchronization program 110a, 110b may select a song that would be preferred by the instructor and the participants. As such, the exercise music synchronization program 110a, 110b may alter previously synchronized exercise music based on a negative feedback received by the instructor or user.

Then, at 212, the exercise music volume is adjusted. Based on the analyzed nonverbal cues associated with the instructor and the extracted keywords from the instructor, the exercise music synchronization program 110a, 110b may adjust the exercise music for the user.

In the present embodiment, the instructor may manually overwrite the adjustment of the exercise music (e.g., volume, expected workout intensity, workout tempo) during the class, if the exercise music synchronization program 110a, 110b erroneously adjusts the exercise music. The instructor may select an "Overwrite" button located at the bottom of the left side of the display monitor. After selecting the "Overwrite" button, the instructor may be prompted (e.g., via dialog box) to select a new song, select type of exercise music, or change a particular adjustment (e.g., tempo or music volume). The instructor may then manually search (e.g., via a third-party digital music service, or user device, server 112 or a cloud storage service, where the exercise music may be locally stored) for a new song or type of exercise music. The current song or type of exercise music may continue to play (and the newly selected song or type of exercise music may not begin) until the instructor has successfully overridden the adjustment of the exercise music. If the instructor intends to change a particular adjustment, then the instructor may select the intended action for that particular adjustment (e.g., decrease the music volume). The instructor may click the "Play" button located at the bottom of the dialog box, and then the dialog box may disappear and the new song, type of exercise music, or the new music adjustment may play.

In alternate embodiment, the exercise music synchronization program 110a, 110b may manually overwrite a music adjustment by utilizing a voice activated software program that utilizes speech recognition to perform a range of tasks on command. If, for example, the instructor decides to overwrite a song currently playing via the exercise music synchronization program 110a, 110b, the instructor commands "Overwrite" and then states "Play song X at volume eight." The exercise music synchronization program 110a, 110b may then stop playing the current music adjustment and play song X at the volume eight as verbally requested by the instructor.

Continuing the previous example, since the workout tempo has increased upward and the expected workout intensity level has increased to a high intensity level, the exercise music synchronization program 110a, 110b increases the music volume to two decibels higher than the previous exercise music song played.

In the present embodiment, the user or instructor may, via direct communication, provide feedback to the exercise music synchronization program 110a, 110b for the generated exercise music, including workout intensity, tempo and music volume, corresponding with the analyzed nonverbal cues and extracted keywords from the instructor. The exercise music synchronization program 110a, 110b may utilize a computer display monitor existing on the user device. A screen may appear in which, for example, a "Feedback" button is located on the bottom left side. Once the user or instructor clicks on the "Feedback" button, the user or instructor may be prompted (e.g., via dialog box) to provide feedback related to a particular output (e.g., workout intensity, tempo and music volume) associated with the exercise music synchronization program 110a, 110b.

In at least one embodiment, the exercise music synchronization program 110a, 110b may collect the feedback from the social networking posts associated with the user or the instructor. In at least one embodiment, the exercise music synchronization program 110a, 110b may generate a survey to the user or the instructor, via email, instant messaging service or text messaging service, for feedback associated with the particular output associated with the exercise music synchronization program 110a, 110b.

In the present embodiment, utilizing adaptive learning (i.e., machine learning), the exercise music synchronization program 110a, 110b may utilize the feedback provided by the user or the instructor to determine whether an adjustment of the exercise music (e.g., workout tempo, expected workout intensity or music volume) is necessary. In addition, the exercise music synchronization program 110a, 110b may be utilized to decrease or eliminate any erroneous adjustments of the exercise music.

In another embodiment, the exercise music synchronization program 110a, 110b may store the analyzed nonverbal cues associated with the instructor and the extracted keywords from the instructor with the corresponding generated exercise music, including expected workout intensity, workout tempo and music volume, in a database 114 for retrieval for a future goal workout with the same or similar instructor, or the same or similar goal workout.

In at least one other embodiment, the extracted keywords with the corresponding action for the user and for the exercise music synchronization program 110a, 110b (i.e., corresponding generated exercise music, including expected workout intensity, workout tempo and music volume) may be stored in the list of predefined keywords from the instructor, which is stored in a database 114.

In another embodiment, the exercise music synchronization program 110a, 110b may adjust the tempo and the volume for a predetermined music playlist prepared by the instructor. As such, the exercise music synchronization program 110a, 110b may be utilized to adjust the exercise music in the predetermined music playlist without changing the song or type of exercise music played. The instructor may utilize a software program to upload a music playlist to the exercise music synchronization program 110a, 110b. Based on the commands and the nonverbal cues of the instructor, the exercise music synchronization program 110a, 110b may adjust the tempo or volume of the exercise music in the predetermined music playlist. For example, if the instructor commands "Cooling Down" while a fast tempo electronic dance music song is playing, then the exercise music synchronization program 110a, 110b may slow down the tempo of that song as well as lower the volume. Therefore, the exercise music synchronization program 110a, 110b may alter the speed and volume of the song, instead of changing the song to match with the determined intensity level, and the verbal and nonverbal cues of the instructor.

Utilizing the mapping of biometric data generated on the voice commands associated with the instructor (i.e., verbal cues) and the nonverbal cues associated with the instructor (i.e., facial expression, hand gestures, tone, body language), the exercise music synchronization program 110a, 110b may be able to synchronize, in real time, the music type, intensity, tempo and volume of the exercise music to seamlessly create a positive outcome and greatly improve the participant's workout. Additionally, the functionality of the computer may be improved by the exercise music synchronization program 110a, 110b because the synchronicity between the verbal and nonverbal cues of the instructor and the exercise music is automated and in real time, thereby allowing the computer to receive and analyze data in such a way that was not previously performed by a computer. The exercise music synchronization program 110a, 110b utilizes machine learning to identify and analyze the instructor's verbal and nonverbal cues, and determines the appropriate exercise music for a participant based on the instructor's cues (i.e., both verbal and nonverbal cues) and any feedback from the user and instructor to further improve the computer's functionality.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
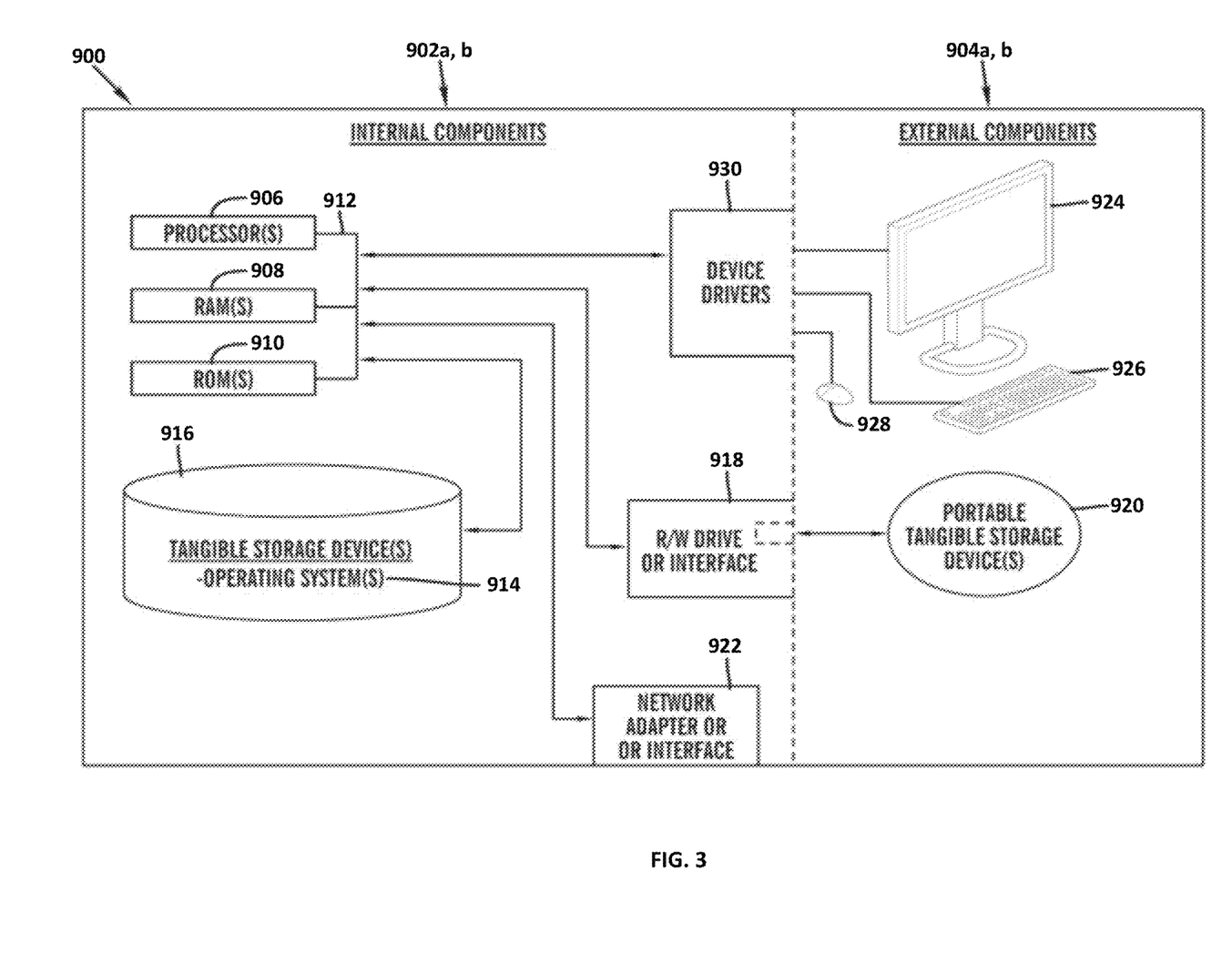
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the exercise music synchronization program 110a in client computer 102, and the exercise music synchronization program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the exercise music synchronization program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the exercise music synchronization program 110a in client computer 102 and the exercise music synchronization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the exercise music synchronization program 110a in client computer 102 and the exercise music synchronization program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
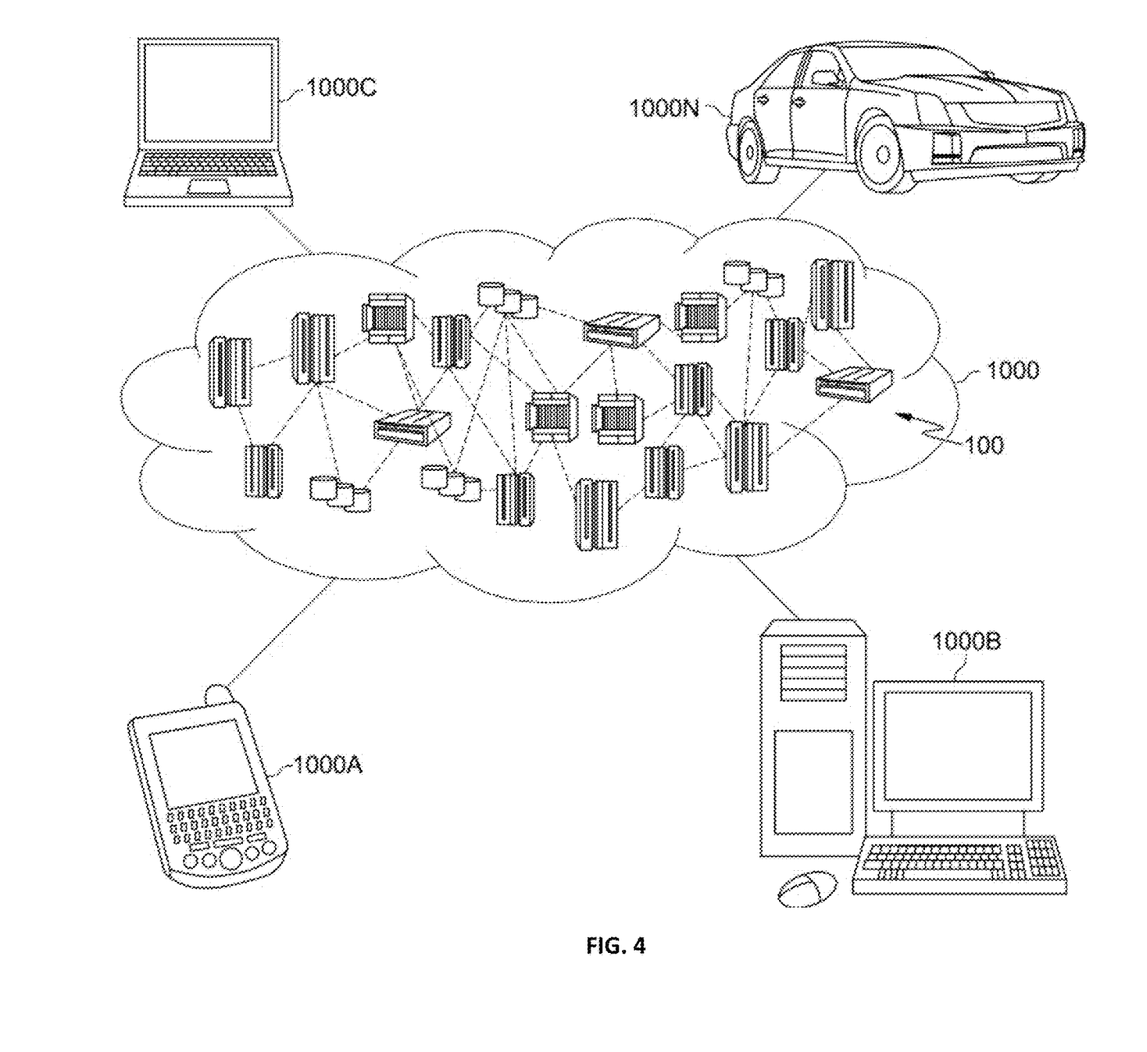
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
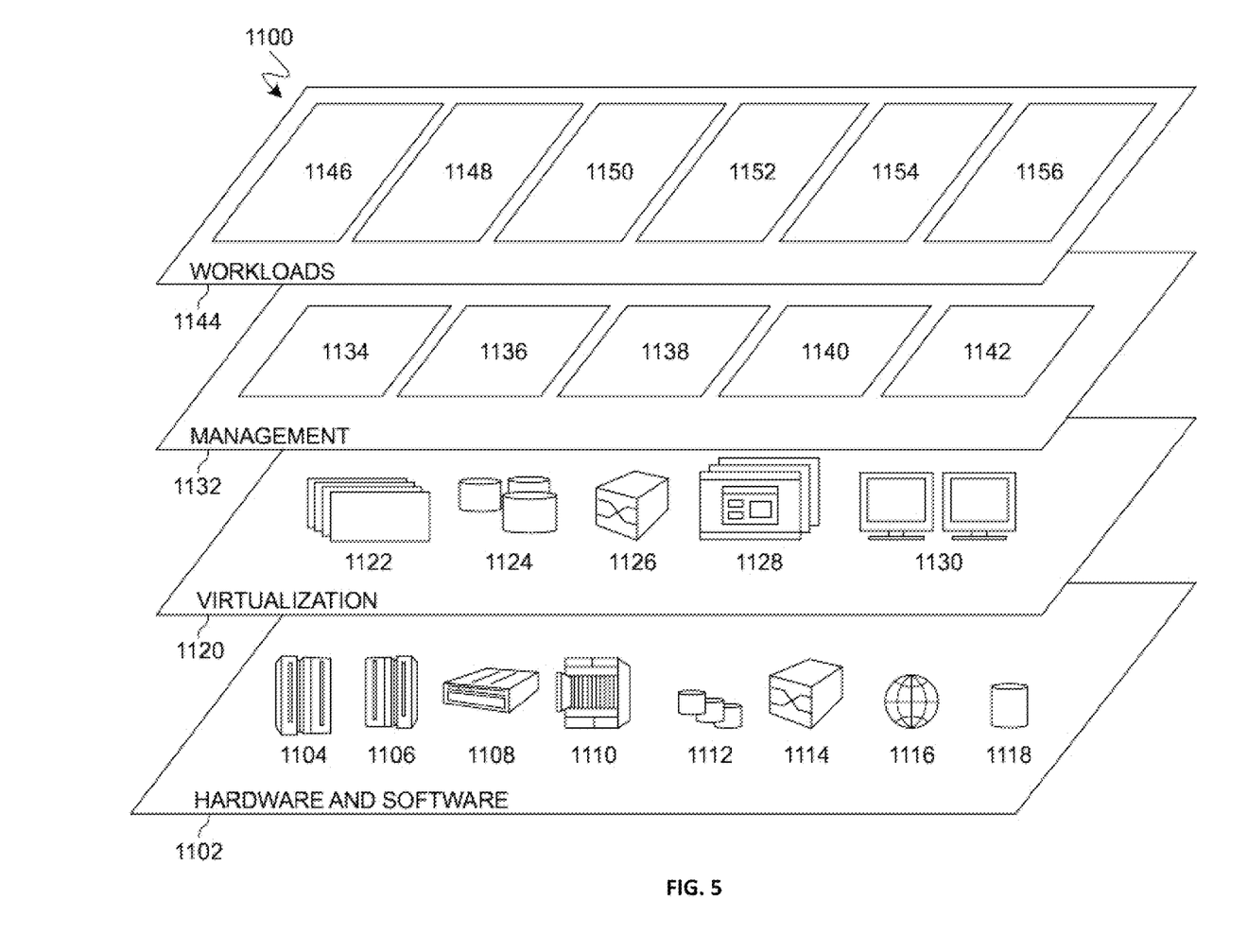
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and exercise music synchronization 1156. An exercise music synchronization program 110a, 110b provides a way to intelligently synchronize exercise music for instructor based group workouts.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for intelligently synchronizing exercise music for an instructor based group workout, the method comprising:
   identifying at least one goal workout;
   receiving a plurality of verbal cues associated with an instructor and a plurality of nonverbal cues associated with the instructor;
   analyzing the received plurality of verbal cues and the received plurality of nonverbal cues;
   monitoring the received plurality of verbal cues associated with the instructor and the received plurality of nonverbal cues associated with the instructor by utilizing a plurality of biometric devices, wherein the monitored plurality of nonverbal cues includes, at least, a plurality of tone cues associated with the instructor, and wherein the plurality of tone cues include a voice pitch cue, a voice quality cue, and a strength of voice command cue from the instructor;
   extracting at least one keyword associated with the monitored plurality of verbal cues;
   collecting at least one piece of feedback received from a workout participant of a prior workout via one or more social network posts from the workout participant about the prior workout; and
   generating the exercise music based on the analyzed plurality of verbal cues, the analyzed plurality of nonverbal cues, and the collected at least one piece of feedback.

2. The method of claim 1 in which the monitored plurality of nonverbal cues associated with the instructor further includes at least one of the following:
   (i) monitoring a plurality of facial expressions associated with the instructor,
   (ii) monitoring a plurality of body language cues associated with the instructor, and
   (iii) monitoring a plurality of hand gestures associated with the instructor.

3. The method of claim 1, wherein generating the exercise music based on the analyzed plurality of verbal cues and analyzed plurality of nonverbal cues, further comprises:
   determining an expected workout intensity level associated with the analyzed plurality of verbal cues and analyzed plurality of nonverbal cues;
   determining a workout tempo corresponding with the determined expected workout intensity level; and
   determining a music volume corresponding with the determined workout tempo and determined expected workout intensity level.

4. The method of claim 1, further comprising:
   associating the analyzed plurality of nonverbal cues associated with the instructor and the analyzed plurality of verbal cues with the corresponding generated exercise music; and
   storing the associated plurality of nonverbal cues and associated plurality of verbal cues with the corresponding generated exercise music in a database.

5. The method of claim 1 in which the utilized plurality of biometric devices includes a plurality of speech recognition sensors and at least one camera.

6. A computer system for intelligently synchronizing exercise music for an instructor based group workout, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
   identifying at least one goal workout;
   receiving a plurality of verbal cues associated with an instructor and a plurality of nonverbal cues associated with the instructor;
   analyzing the received plurality of verbal cues and the received plurality of nonverbal cues;
   monitoring the received plurality of verbal cues associated with the instructor and the received plurality of nonverbal cues associated with the instructor by utilizing a plurality of biometric devices, wherein the monitored plurality of nonverbal cues includes, at least, a plurality of tone cues associated with the instructor, and wherein the plurality of tone cues include a voice pitch cue, a voice quality cue, and a strength of voice command cue from the instructor;
   extracting at least one keyword associated with the monitored plurality of verbal cues;
   collecting at least one piece of feedback received from a workout participant of a prior workout via one or more social network posts from the workout participant about the prior workout; and
   generating the exercise music based on the analyzed plurality of verbal cues, the analyzed plurality of nonverbal cues, and the collected at least one piece of feedback.

7. The computer system of claim 6 in which the monitored plurality of nonverbal cues associated with the instructor includes at least one of the following:
   (i) monitoring a plurality of facial expressions associated with the instructor,
   (ii) monitoring a plurality of body language cues associated with the instructor, and
   (iii) monitoring a plurality of hand gestures associated with the instructor.

8. The computer system of claim 6, wherein generating the exercise music based on the analyzed plurality of verbal cues and analyzed plurality of nonverbal cues, further comprises:
   determining an expected workout intensity level associated with the analyzed plurality of verbal cues and analyzed plurality of nonverbal cues;
   determining a workout tempo corresponding with the determined expected workout intensity level; and
   determining a music volume corresponding with the determined workout tempo and determined expected workout intensity level.

9. The computer system of claim 6, further comprising:
   associating the analyzed plurality of nonverbal cues associated with the instructor and the analyzed plurality of verbal cues with the corresponding generated exercise music; and
   storing the associated plurality of nonverbal cues and associated plurality of verbal cues with the corresponding generated exercise music in a database.

10. The computer system of claim 6 in which the utilized plurality of biometric devices includes a plurality of speech recognition sensors and at least one camera.

11. A computer program product for intelligently synchronizing exercise music for an instructor based group workout, comprising:
   one or more computer-readable storage non-transitory media and program instructions stored on at least one of the one or more computer-readable non-transitory storage media, the program instructions executable by a processor to cause the processor to perform a method comprising:

identifying at least one goal workout;

receiving a plurality of verbal cues associated with an instructor and a plurality of nonverbal cues associated with the instructor;

analyzing the received plurality of verbal cues and the received plurality of nonverbal cues;

monitoring the received plurality of verbal cues associated with the instructor and the received plurality of nonverbal cues associated with the instructor by utilizing a plurality of biometric devices, wherein the monitored plurality of nonverbal cues includes, at least, a plurality of tone cues associated with the instructor, and wherein the plurality of tone cues include a voice pitch cue, a voice quality cue, and a strength of voice command cue from the instructor;

extracting at least one keyword associated with the monitored plurality of verbal cues;

collecting at least one piece of feedback received from a workout participant of a prior workout via one or more social network posts from the workout participant about the prior workout; and generating the exercise music based on the analyzed plurality of verbal cues, the analyzed plurality of nonverbal cues, and the collected at least one piece of feedback.

12. The computer program product of claim 11 in which the monitored plurality of nonverbal cues associated with the instructor includes at least one of the following:

(i) monitoring a plurality of facial expressions associated with the instructor, (ii) monitoring a plurality of body language cues associated with the instructor, and (iii) monitoring a plurality of hand gestures associated with the instructor.

13. The computer program product of claim 11, wherein generating the exercise music based on the analyzed plurality of verbal cues and analyzed plurality of nonverbal cues, further comprises:

determining an expected workout intensity level associated with the analyzed plurality of verbal cues and analyzed plurality of nonverbal cues;

determining a workout tempo corresponding with the determined expected workout intensity level; and determining a music volume corresponding with the determined workout tempo and determined expected workout intensity level.

14. The computer program product of claim 11, further comprising:

associating the analyzed plurality of nonverbal cues associated with the instructor and the analyzed plurality of verbal cues with the corresponding generated exercise music; and storing the associated plurality of nonverbal cues and associated plurality of verbal cues with the corresponding generated exercise music in a database.

15. The computer program product of claim 11 in which the utilized plurality of biometric devices includes a plurality of speech recognition sensors and at least one camera.

* * * * *